United States Patent [19]
Fujisaka et al.

[11] Patent Number: 4,924,235
[45] Date of Patent: May 8, 1990

[54] HOLOGRAPHIC RADAR

[75] Inventors: Takahiko Fujisaka, Yokohama; Yoshimasa Ohashi, Fujisawa; Mithimasa Kondo, Yokohama, all of Japan

[73] Assignee: Mitsubishi Denki Kabushiki Kaisha, Tokyo, Japan

[21] Appl. No.: 290,048

[22] PCT Filed: Feb. 10, 1988

[86] PCT No.: PCT/JP88/00131
§ 371 Date: Oct. 12, 1988
§ 102(e) Date: Oct. 12, 1988

[87] PCT Pub. No.: WO88/06295
PCT Pub. Date: Aug. 25, 1988

[30] Foreign Application Priority Data

Feb. 13, 1987 [JP] Japan .................................. 62-32101
Apr. 14, 1987 [JP] Japan .................................. 62-91187

[51] Int. Cl.⁵ .............................................. H04B 7/00
[52] U.S. Cl. ...................................... 342/374; 342/158
[58] Field of Search ..................... 342/158, 374, 191

[56] References Cited

U.S. PATENT DOCUMENTS 3,806,932  4/1974  Dietrich et al. .
3,816,830  6/1974  Giannini ............................. 342/374
3,964,066  6/1976  Nemit ................................. 342/373
4,017,860  4/1977  Earp .
4,451,831  5/1984  Stangel et al. ...................... 342/374

FOREIGN PATENT DOCUMENTS 58-36313  8/1983  Japan .

OTHER PUBLICATIONS

"Digital Beamforming Techniques for Radar", Ruvin et al., Eascon 78 Record, Sep. 25-27, 1978.

*Primary Examiner*—Thomas H. Tarcza
*Assistant Examiner*—Mark Hellner
*Attorney, Agent, or Firm*—Birch, Stewart, Kolasch & Birch

[57] ABSTRACT

In a holographic radar having receivers (10) for amplifying, detecting, and A/D-converting the RF signals in all range bins received by antenna elements (1) and a digital beamformer (11) for performing digital operations on the outputs of these receivers to generate a number of beams equal to the number of antenna elements, three or four antenna arrays (D0 to D3), each array (2) being formed of a plurality of antenna elements (1), are oriented in different directions to provide 360° coverage and switches (12) are provided to switch the connection between the antenna elements (1) and the receivers (10) according to pulse hit numbers and range bin numbers. Thus high-speed 360° scan coverage can be attained with a small, inexpensive apparatus requiring as many receivers, memory elements and a digital beam former as needed for a single antenna array.

The number of receivers can be further reduced by assigning one receiver per group of K array elements, providing memory elements, in number corresponding to the number of antenna elements, and operating further switches in synchronization with the transmit pulses and storing the video signals in the respective memory elements.

2 Claims, 5 Drawing Sheets

HOLOGRAPHIC RADAR

TECHNICAL FIELD

This invention relates to a holographic radar with improved 360° scanning performance and reduced size and weight.

BACKGROUND ART

FIG. 1 is a block diagram of a prior-art holographic radar shown in the paper "Digital Multiple Beamforming Techniques for Radar" by Abraham E. Ruvin and Leonard Weinberg in *EASCON*-78 *Record*, a publication of the Institute of Electrical and Electronics Engineers (IEEE). The radar shown in FIG. 1 comprises N antenna elements 1 forming an antenna 2, RF amplifiers 3 connected to the antenna elements to amplify the radio-frequency signal received by the antenna element, mixers 4 which convert the received RF signal to an intermediate-frequency signal, IF amplifiers 5 which amplify the intermediate-frequency signal output from the mixers 5, phase detectors 6 which convert the output of the IF amplifiers to a baseband complex video signal while preserving the phase of the intermediate-frequency signal, low-pass filters 7 connected to the I (in-phase) channel output and Q (quadrature) channel output of the phase detectors 6, A/D converters 8 connected to the low-pass filters 7 for converting the analog baseband complex video signal to a digital signal, and multipliers 9 for weighting the digital signals output by the A/D converters 8 to adjust the sidelobe levels in the beamforming process. Receivers 10 comprise the preceding components 3 to 9. A digital multiple beamformer 11 performs mathematical operations on the outputs of the receivers 10 connected to the respective antenna elements 1 to create multiple beams corresponding in number to the number of antenna elements.

This radar operates as described next.

The radio-frequency signals received by the N antenna elements are amplified by the RF amplifiers 3, then down-converted by the mixers 4 to an intermediate frequency and amplified again by the IF amplifiers 5. The phase of the intermediate-frequency signals is detected by the phase detectors 6, which convert the signals to complex video signals comprising an I-channel component and a Q-channel component. The complex video signals are band-restricted by the low-pass filters 7, converted to digital complex video signals by the A/D converters 8, and weighted by the multipliers 9 to reduce the side lobes in the beamforming process, then supplied to the digital multiple beamformer 11. The direction in which the N antenna elements are aligned is shown as the x-axis in FIG. 2. Let $\alpha$ be the angle of the incoming RF wavefront with respect to the x-axis, let d be the antenna element spacing, and let $\lambda$ be the wavelength. The phase difference between the signals received by adjacent antenna elements is then $2\pi(d \cos \alpha)$. The digital multiple beamformer 11 can simultaneously create N beams ($r = -N/2, \ldots 0, \ldots, N/2-1$) having a maximum gain at $\alpha r = \cos^{-1}(r\lambda/Nd)$ by performing the following calculations:

$$Br = \sum_{k=-N/2}^{N/2-1} W k \exp(j2\pi kd \cos \alpha/\lambda) \exp(-j(2\pi/N) kr) \quad (1)$$

$$r = -N/2, -N/2 + 1, \cdots, 0, \cdots, N/2 - 1$$

where Wk is a weighting coefficient introduced by the multipliers in the receiver 10 to suppress side lobes.

The beam width $\delta r$ of the r-th beam is given by equation (2) below:

$$\delta r = w\lambda/Nd \sin \alpha r \quad (2)$$

The interval $\Delta \alpha r$ between the r-th beam and the r-1-th beam is given by the equation (3):

$$\Delta \alpha r = \alpha r - \alpha r - 1 \quad (3)$$
$$= \lambda/Nd \sin \alpha r$$

In equation (2), w is a constant determined by the coefficients Wk, and is generally set in the range from about 0.88 to 1.3. In the digital multiple beamformer 11, equation (1) describes a discrete Fourier transform (DFT). Holographic radars therefore employ the fast Fourier transform (FFT) algorithm to efficiently form a multiple beam in the field of observation, which is the coverage field determined by the antenna element beam width.

Due to the configuration described above, the field of observation of prior-art holographic radars is limited by the antenna element beam width (approximately 120°). To scan the entire 360° field it is necessary for the radar to be rotated mechanically, which lengthens the time required for a 360° scan, or for the field to be divided among three or four radars, which increases the cost of the apparatus.

Another problem is that a separate receiver is required for each antenna element, in contrast to a phased-array radar which performs analog beam forming in the RF stage. The large number of receivers adds significantly to the size and weight of the apparatus, and the receivers consume considerable power.

DISCLOSURE OF INVENTION

A holographic radar according to this invention comprises three or four antenna arrays, a number of receivers adequate for one antenna array, and switches for connecting the receivers to the antenna arrays in turn. The receivers amplify, detect, and A/D-convert the outputs of the three or four antenna arrays according to a time-division scheme controlled by a switch controlling means according to a pulse hit number and range bin number. A digital multiple beamforming means uses the data output from the receivers corresponding one antenna array to generate multiple beams.

By switching a single set of receivers among three or four antenna arrays, this invention enables a 360° scan to be accomplished rapidly by an inexpensive apparatus.

To further reduce the number of receivers in a single antenna array, this invention can provide one receiver for every K antenna elements, memory elements for storing the data output by the receivers, and switches for switching the connections between the antenna elements and the receivers, and between the receivers and the memory elements. These switches enable each receiver to process the RF signals received by K antenna elements, so the number of receivers can be reduced by a further factor of K, making the apparatus small in size and light in weight.

BEST MODE OF CARRYING OUT THE INVENTION

Figure 1:
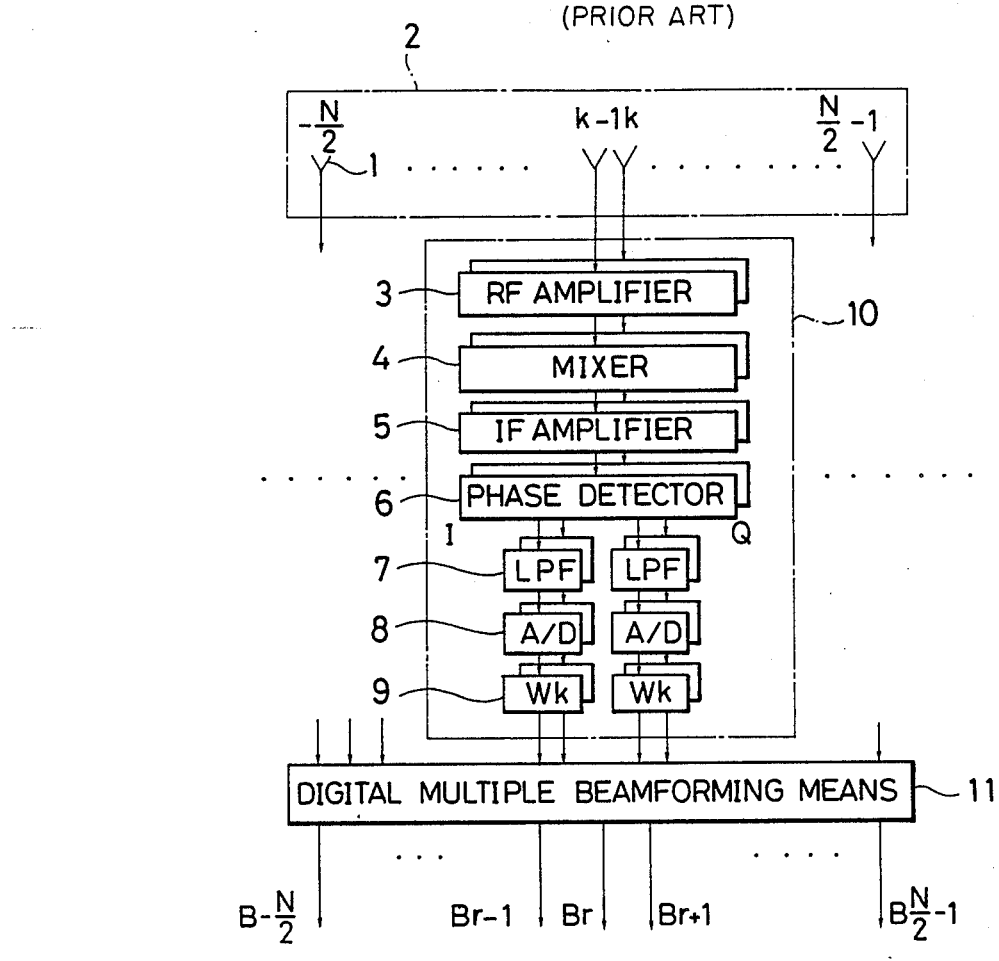
FIG. 1 is a block diagram of a prior-art holographic radar.
Figure 2:
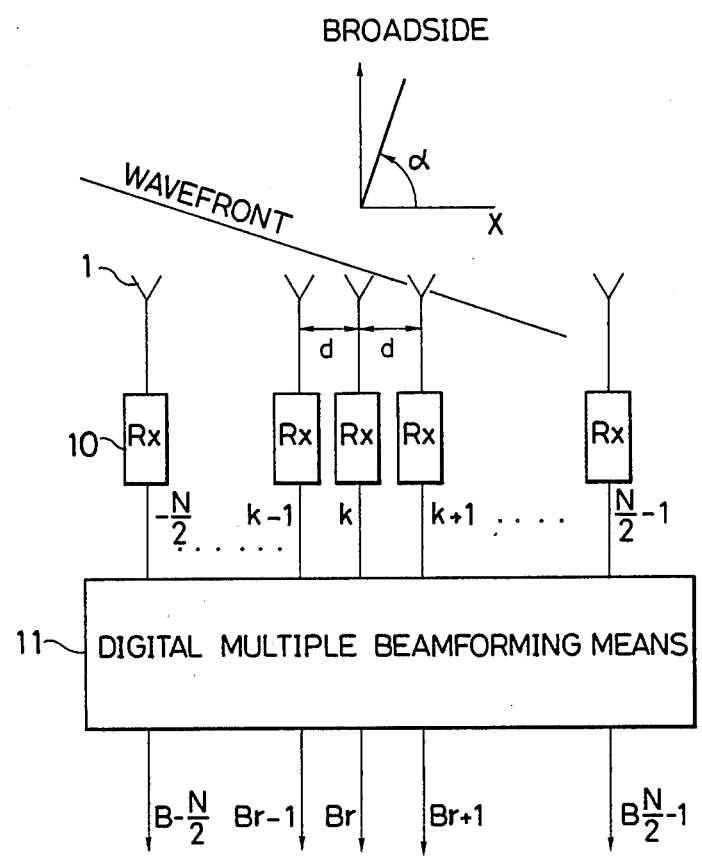
FIG. 2 illustrates the principle of operation of the radar in FIG. 1.
Figure 3:
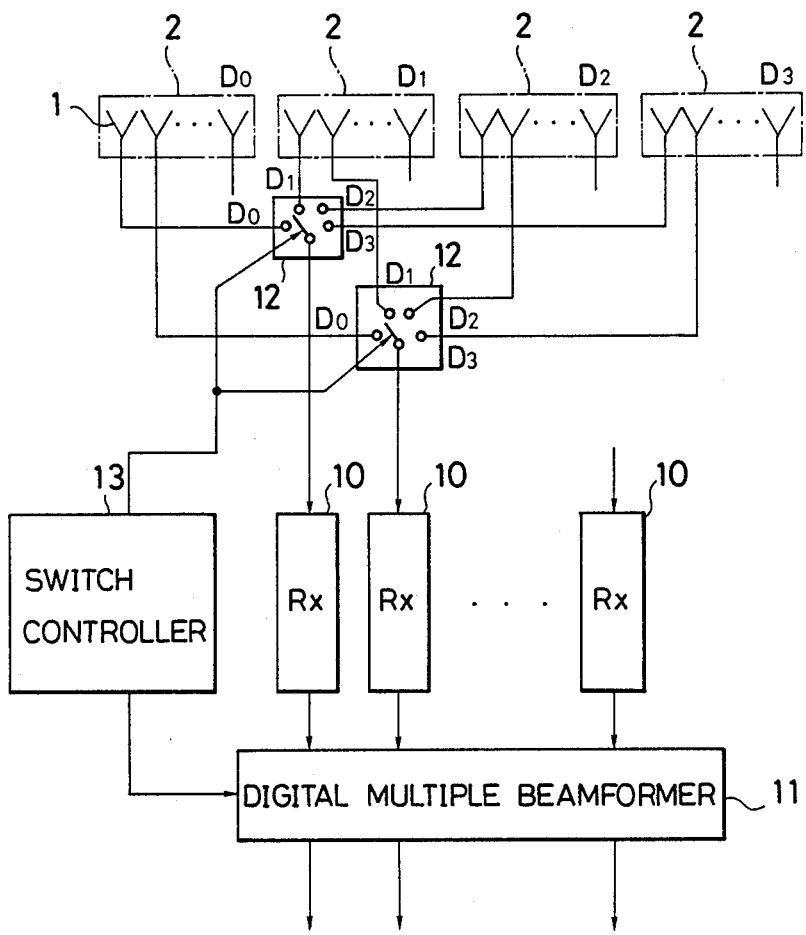
FIG. 3 is a block diagram of a holographic radar illustrating an embodiment of the present invention.

An embodiment of this invention will be explained with reference to the drawings. FIG. 3 shows a holographic radar comprising four antenna arrays 2, a set of receivers 10 equal in number to the antenna elements 1 in a single antenna array 2, switches 12 for switching the receivers 10 among the antenna arrays 2, and switch controlling means 13 for controlling the timing of the switches 12 according to a transmit pulse number and a range bin number. Components numbers 1 to 11 in FIG. 3 are identical to the corresponding components in FIG. 1.

The operation of this holographic radar will be described next. The operation of the receivers 10 and the digital multiple beamformer 11 will not be described because it is the same as in the prior art, but a detailed description will be given of the switches 12 and the switch controlling means 13, which are the new components in this embodiment.

Figure 4:
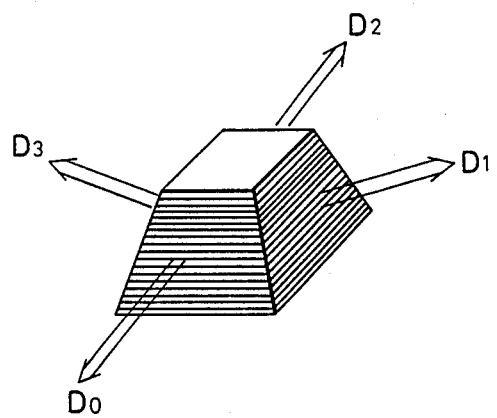
FIG. 4 is an oblique view of a quadruple antenna array.

The four antenna arrays ($D_0$, $D_1$, $D_2$, $D_3$) are disposed as shown in FIG. 4, so that they divide the coverage range into four directions $D_0$, $D_1$, $D_2$, and $D_3$. Let Gt be the transmitting antenna gain, Gr be the receiving antenna gain after multiple beamforming, $\lambda$ be the transmit wavelength, Pt be the peak transmitting power, $\sigma$ be the radar cross-section of the target, SNR be the signal-to-noise power radio, K be Boltzmann's constant, T represent absolute temperature, B be the receiver bandwidth, NF be the receiver noise figure, L be the system loss, $\Delta R$ be the range resolution, and k be the range bin number. Then the k-th pulse hit number Nk, which is the coherent integral number required in the k-th range bin, is given by equation (4).

$$Nk = \left\{ \frac{(4\pi)^3 \, KTB(NF) \, L(SNR) \, (\Delta R)^4}{Pt \, Gt \, Gr \, \lambda^2 \, \sigma} \right\} k^4 \quad (4)$$

The parameters inside the braces {} in equation (4) are constants characteristic of the individual radar system, so the required pulse hit number Nk is proportional to the fourth power of the range bin number k.

The switch controlling means 13 determines the required pulse hit number Nk in each range bin from equation (4) and the values of the parameters K, T, B, NF, L, SNR, $\Delta R$, Pt, Gr, $\lambda$, and $\sigma$ for the particular radar system. For each transmitted pulse, it divides the current transmit pulse number m by the required pulse hit number Nk for the range bin number k to obtain the quotient lk.

$$lk = [m/Nk] \quad (5)$$

The brackets [] in equation (5) are the Gaussian notation for the greatest integer. The remainder Jk when the quotient lk is divided by the number of antenna arrays (4) is also found. The switches 12 are set to connect the receivers to the $D_0$ antenna array 2 if Jk=0, to the $D_1$ array if Jk=1, to the $D_2$ array if Jk=2, and to the $D_3$ array if Jk=3. This operation is carried out in all range bins k for every transmit pulse number m, thereby providing 360° scan coverage by a set of receivers for a single antenna array much faster than if the array had been turned mechanically as in the prior art.

Figure 5:
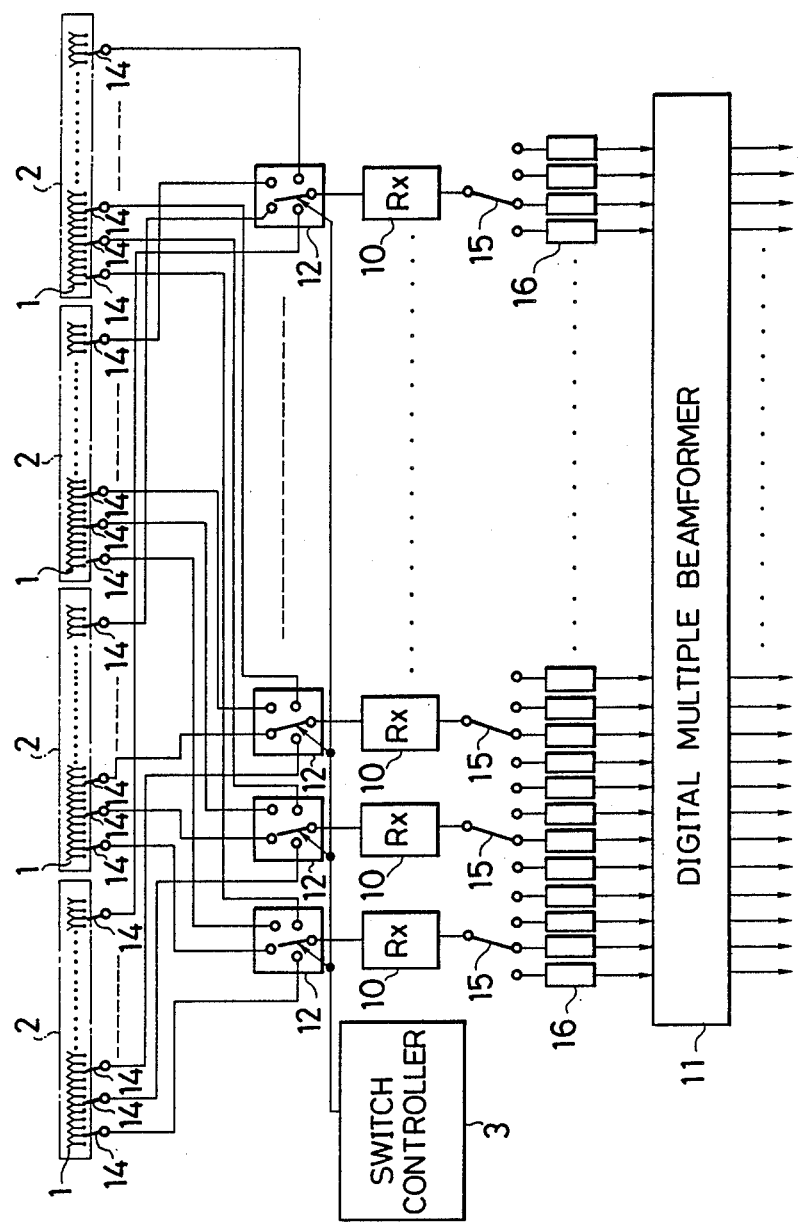
FIG. 5 is a block diagram of a holographic radar illustrating another embodiment of the present invention.

Another embodiment of this invention is illustrated in FIG. 5. In this embodiment a set of switches 14 are located between the antenna elements 1 and the antenna array-switching switches 12, and another set of switches 15 are provided that connect the receivers 10 with a set of memory elements 16 which store the output from the receivers 10. The components numbered 1 to 13 are the same as in the embodiment shown in FIG. 3.

The operation of a holographic radar according to the embodiment in FIG. 5 will be explained next. The internal operation of the receivers 10 and the digital multiple beamformer 11 will not be described because it is the same as in the prior art, but detailed descriptions will be given of the switches 14 and 15 and memory elements 16, which are the new elements in this embodiment.

The number of antenna elements N and the number of receivers L in this holographic radar are selected so that the ratio K=N/L is a natural number. Each group of K adjacent antenna elements is assigned to a single receiver 10. The L receivers 10 and the switches 14 and 15 connected to their input and output terminals all operate alike.

At the start of the observation, synchronized with the first transmitted pulse, the switches 14 are set to connect the input terminals of the switches 12 to the first antenna elements 1 in each group of K adjacent antenna elements 1 assigned one each receiver 10, and the switches 15 connect the output terminals of each receiver 10 to the first of its K assigned memory elements. The switches remain connected in this manner until the second transmit pulse is fired; during this interval the radio-frequency signals in all the range bins of the first antenna element in each group are amplified, detected, and A/D-converted, and the resulting digital complex video signals are stored in the first memory elements 16 in each group. Then in synchronization with the second transmit pulse, the switches 14 and 15 switch to connect the second antenna element 1 in each group to the input terminal of the antenna array-switching switch 12, and connect the receiver output terminal to the second memory element 16, so that the radio-frequency signals received by the second antenna elements are amplified, detected, A/D-converted, and stored. This operation is repeated in sequence through the K-th transmit pulse. When complex video signals have been stored in all K memory elements 16 assigned to each of the L receivers 10, all the complex video signals are read out simultaneously, providing the digital multiple beamformer 11 with KL digital complex video signal, a number equal to the number N of antenna elements.

The digital multiple beamformer 11 then generates N multiple beams in the same way as in the prior art, just as if N antenna elements and N receivers had been used.

INDUSTRIAL APPLICABILITY

This invention can be used to provide a compact, lightweight holographic radar with an improved 360° scan coverage rate. It can also be applied to other communication apparatus such as sonar apparatus and digital beamforming antennas that use a digital multiple beamformer.

We claim:

1. A holographic radar comprising:
   a plurality of antenna arrays each comprising a plurality of antenna elements,
   a like plurality of receivers connected one at a time to each of the antenna elements of a respective array of said antenna arrays,
   switches for switching the connections between each of the receivers and the antenna elements of the respective arrays connected thereto,
   switch controlling means for synchronously controlling the timing of switching of said switches according to pulse hit numbers and range bin numbers, and
   a digital multiple beamforming means coupled to the outputs of each of said receivers to generate multiple beams.

2. A holographic radar comprising:
   a plurality of antenna arrays each comprising a plurality of antenna elements,
   a first plurality of array-switching switches and receivers, one array-switching switch and one receiver being provided per each K number of antenna elements in a single antenna array, where K is an integer equal to or greater than 2,
   a plurality of memory elements corresponding to the number of antenna elements in each antenna array for sequentially storing the output data from each of the first plurality of receivers,
   a second and third plurality of switches respectively coupled between said antenna elements and said first array-switching switches, and between said receivers and said memory elements for providing a time-division input of the signals received in each group of K antenna elements through said first array-switching switch to said receiver and successive storage of the output of said receiver in the corresponding memory element,
   switch controlling means for synchronously controlling the timing of switching of said first set of switches according to pulse hit numbers and range bin numbers, and
   digital multiple beamforming means coupled to and being responsive to the outputs from said memory elements to generate multiple beams.

* * * * *